June 11, 1957 E. P. MILLER 2,795,516
METHOD AND APPARATUS FOR ELECTROSTATIC COATING
Filed Sept. 21, 1953 8 Sheets—Sheet 1
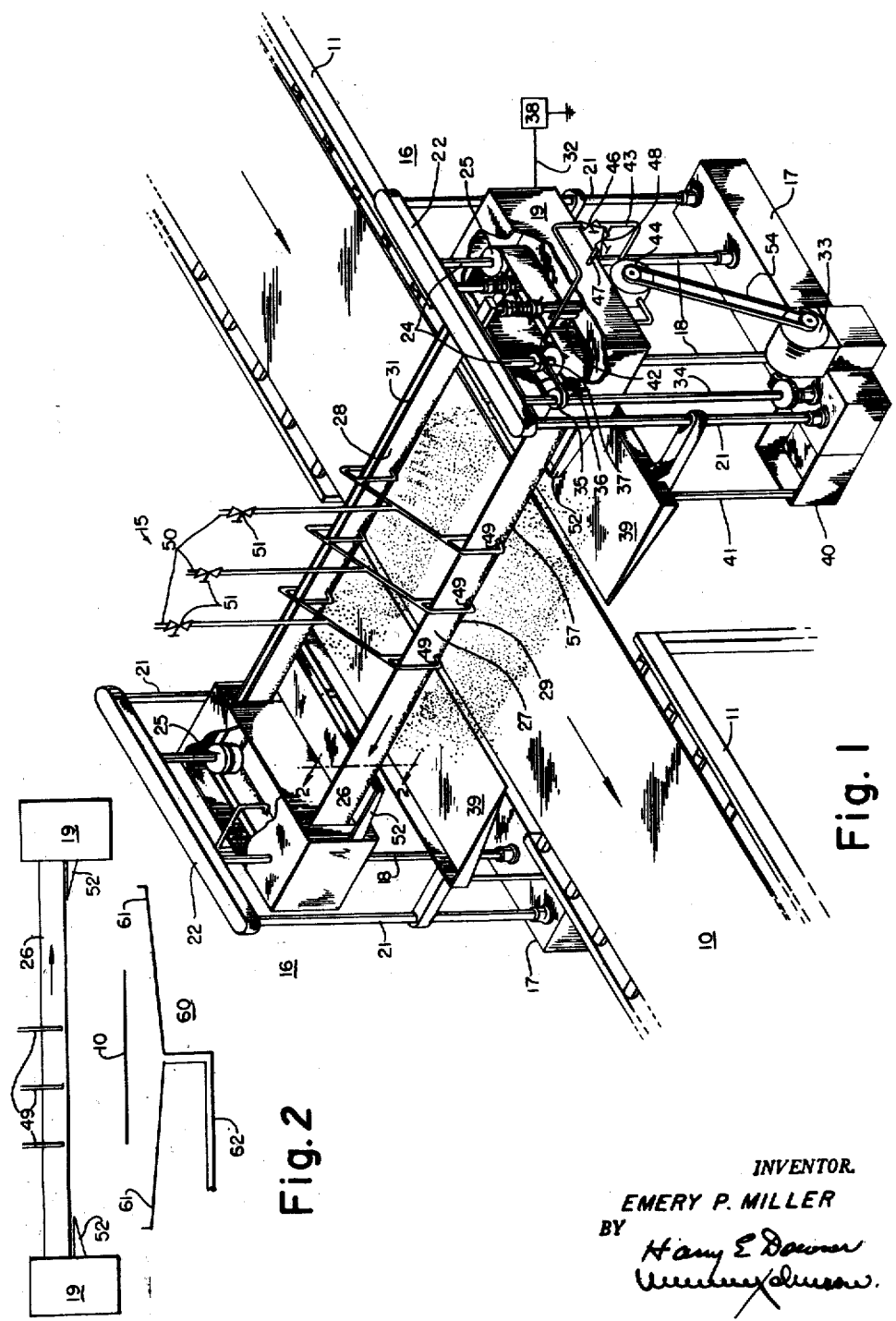
INVENTOR.
EMERY P. MILLER
BY
Attorneys

INVENTOR.
EMERY P. MILLER

June 11, 1957 E. P. MILLER 2,795,516
METHOD AND APPARATUS FOR ELECTROSTATIC COATING
Filed Sept. 21, 1953 8 Sheets-Sheet 3

INVENTOR.
EMERY P. MILLER
BY Harry E Downer
[signature]
Attorneys

INVENTOR.
EMERY P. MILLER

June 11, 1957     E. P. MILLER     2,795,516
METHOD AND APPARATUS FOR ELECTROSTATIC COATING
Filed Sept. 21, 1953     8 Sheets-Sheet 5

INVENTOR.
EMERY P. MILLER
BY
Attorneys

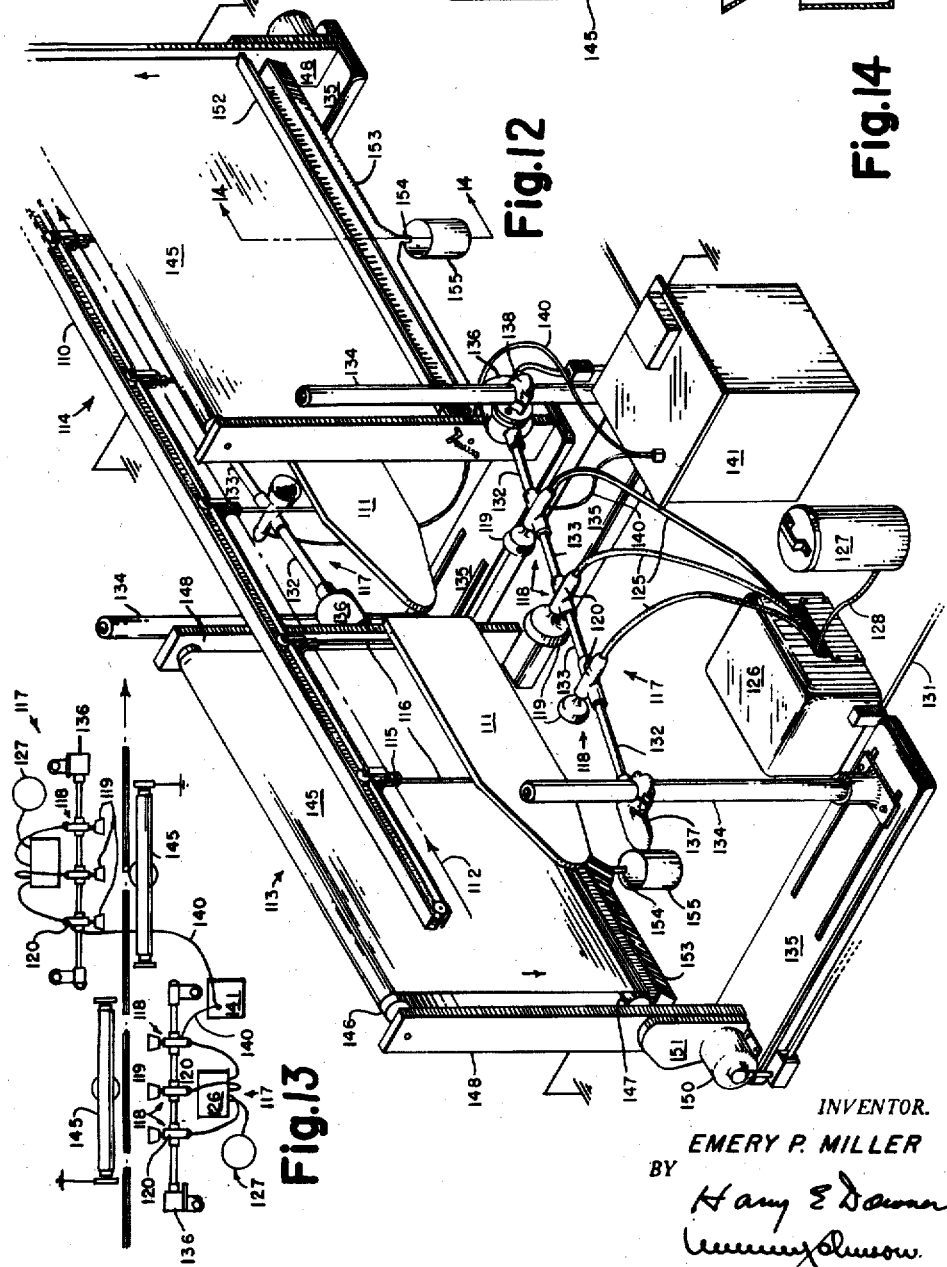

United States Patent Office 2,795,516
Patented June 11, 1957

2,795,516

METHOD AND APPARATUS FOR ELECTROSTATIC COATING

Emery P. Miller, Indianapolis, Ind., assignor to Ransburg Electro-Coating Corp., Indianapolis, Ind., a corporation of Indiana Application September 21, 1953, Serial No. 381,245

37 Claims. (Cl. 117—93)

This invention relates generally to improvements in methods of and apparatus for electrostatically coating articles and especially to that type of electrostatic coating in which a liquid coating material is atomized and deposited under the influence of an electrostatic field in a quiescent atmosphere. This application is a continuation-in-part of my copending application, Serial No. 150,713, filed March 20, 1950.

In methods and apparatus of this type of electrostatic coating, as is more fully described in the copending application of William W. Crouse, Serial No. 141,509, filed January 31, 1950, now Patent No. 2,718,477, it is customary to connect one terminal of a high voltage supply to a suitable atomizing device and the other terminal to the article to be coated which is spaced appropriately from the atomizing device thereby establishing a high potential electrostatic field in a coating zone of quiescent atmosphere between the article and the atomizer. Liquid coating material fed to the atomizer at a controlled rate is atomized into the quiescent atmosphere of the electrostatic field as a spray of finely divided particles which are thereupon deposited onto the surface of the article. The term "quiescent atmosphere" does not mean absolute stillness of the atmosphere in the coating zone since possibly movement of the atomizer itself or the electrical wind may cause some air movement. However, the coating zone is free of turbulent air blasts in the order of those associated with conventional compressed air atomizing guns.

In such a coating arrangement some time is required to get the rate of fluid spray, the rate of atomization and the surface areas to be coated into proper proportionate relationship. If the initially atomized material is allowed to reach the article it may result in a poor quality finish being formed on the surface and thus a commercially rejected article. The problem is additionally complicated when more than one atomizer is used.

Further, when such equipment is stopped the liquid coating material is cut off at its source but some remains on the discharge surfaces of the atomizers and this material will gradually be dissipated. Cessation of the atomizing operation is therefore a gradual rather than a prompt action. Articles which accumulate material atomized during the stopping process therefore may be unsatisfactorily coated.

It has been observed that when spaced sheet-like articles are moved edgewise of themselves past atomizers such as those referred to above the trailing and leading edges of adjacent articles accumulate a greater portion of the coating material than do other portions of the articles and this excess material causes undesirable sagging. The reason for this is that the trailing and leading edges of adjacent sheets moving past an atomizer have a greater attracting influence on the charged spray from the atomizer than the space between the sheets, and therefore, as the sheets move past the atomizer, the spray tends to lag and accumulate excessively on the trailing edge of one sheet after which it "snaps" over to the leading edge of the succeeding sheet with substantially no spray passing through the space between these sheets. The spray lags, for a short time, at the leading edge of the succeeding article before it sweeps over the rest of the surface of this succeeding article. Thus it is seen that the edges of the sheets accumulate as as an excess coating the spray which would otherwise move through the space between adjacent sheets. Also, in such systems, where the surfaces presented to the atomizer to be coated are of varying area, a greater amount of coating material is deposited on the smaller surface area portions than on the larger surface area portions.

It is an object of the invention to provide a novel method and apparatus for applying electrostatically a continuous, uniform coating to large, extensive surfaces with great efficiency.

Another object of the present invention is to insure that atomization of liquid coating material attains a stable condition before the atomized coating material is permitted to be deposited on an article to be coated.

Another object of the invention is to permit all the atomizers of a group to be brought into a stable atomizing condition before any of the material is applied to an article.

Another object is to provide method and apparatus which will prevent the conditions existing at the starting and stopping of the apparatus from causing unsatisfactory coating of articles.

Another object of this invention is to provide a novel method and apparatus by which articles to be coated are finished with improved uniformity.

My invention may be practiced by arranging an atomizer in spaced relation to an electrode and moving an article along a path on the same side of the atomizer as the electrode and spaced from the atomizer and the electrode. A spray of charged particles of liquid coating material is projected from the atomizer generally toward the article moving along the article path and the electrode. The electrode and the article to be coated are maintained at an electrical potential different from that of the atomizer and the charged spray particles to attract and deposit such charged particles on the article and to collect atomized coating material not deposited on the article on the electrode.

One form of apparatus for utilizing my invention comprises an atomizer provided with a discharge portion, means for supplying liquid coating material to said discharge portion, a conducting member at one side of and spaced from said atomizer and oppositely disposed therefrom, means for moving an article over a predetermined path past said atomizer on the side where said conducting member is located, and means including a high voltage source for creating between said conducting member and the article on the one hand and the liquid coating material on said discharge portion of said atomizer on the other hand a potential difference sufficient to atomize particles from the liquid on said discharge portion and deposit such atomized particles on the article, said conducting member collecting atomized coating material not deposited on the article.

My invention may also be utilized for applying a relatively uniform coating to surfaces of articles which vary in dimension transverse to the line of movement of such articles. In such applications the transverse dimension of the spray at the point of intersection with the path of article movement is desirably as great as the greatest transverse dimension of the articles.

It will be evident that the electrode also serves to stabilize the electrostatic field during all phases of the coating operation. When large gaps exist between articles on the conveyor or when open spaces of varying size are presented to the atomizer, due to the changing surface area of the article presented to the charged spray, the presence of the electrode adjacent the articles fills in these gaps or open spaces, and this electrode acts as a pseudo article to maintain continuity of the field and also the atomization.

Where the electrode and the articles are maintained at substantially the same potential, the electrode and the articles may be brought into contact with each other and a coating of satisfactory uniformity on the articles may still be obtained. Where an electrostatic atomizer is not used for introducing the spray into the coating zone a discharge electrode may be substituted for it and disposed in opposed spaced relation to the other electrode.

The foregoing features and objects of my invention will appear more fully from the following detailed description together with the accompanying drawings, in which:

Fig. 1 is an isometric view of one form of apparatus embodying the invention;

Fig. 2 is a sectional schematic diagram illustrating another embodiment of my invention as used to coat discontinuous surfaces;

Fig. 3 is a perspective view of one modification of the invention as used in conjunction with a group of atomizers;

Fig. 4 is a detail of the conveyor shown in Fig. 3 taken in section;

Fig. 5 is a side elevation of the magnetic stop in the apparatus shown in Fig. 3;

Fig. 6 is a schematic wire diagram of the electric apparatus shown in Fig. 3;

Fig. 7 is a schematic plan view showing relative arrangement of various elements of the apparatus shown in Fig. 3;

Fig. 8 is a perspective view of another modification of the invention as modified for use with a single atomizer;

Fig. 9 is a diagram of the electrical circuits associated with the apparatus shown in Fig. 7;

Fig. 10 is a schematic diagram of the steps (A through G) in the operation of another modification of the invention;

Fig. 11 is the electrical connection for the modification shown in Fig. 10;

Figs. 12 through 19 show features of my invention taken from my copending application, Serial No. 230,001, and Fig. 12 is a perspective view of a further embodiment of apparatus arranged for coating a plurality of articles such as ironing boards;

Fig. 13 is a schematic plan view of the apparatus shown in Fig. 12 illustrating the relative positions of various parts of the apparatus with respect to each other;

Fig. 14 is a partial schematic view taken along line 3—3 of Fig. 12 showing the apparatus for cleaning the backing electrode;

Figs. 15 and 16 are schematic plan views of apparatus in modified form as shown in Figs. 12 and 13;

Fig. 17 shows a partial side elevation of apparatus for supporting an article used in conjunction with the apparatus illustrated in Figs. 15 and 16;

Fig. 18 is a schematic plan view of apparatus similar to that shown in Fig. 12 except that another form of backing electrode is used; and Fig. 19 is a schematic side elevation view illustrating a novel arrangement of backing electrodes which is adapted for use in connection with coating continuous sheet material.

Figure 3:
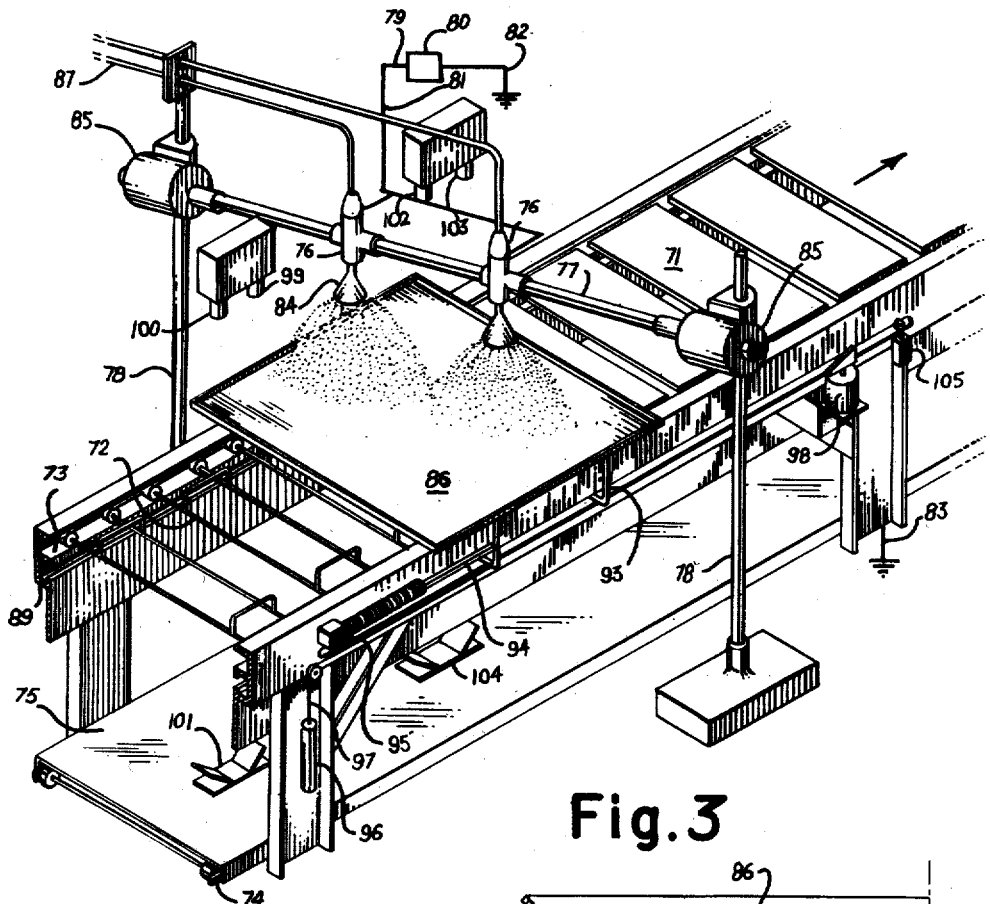
Figs. 3 through 11 show features of my invention taken from my copending application Serial No. 212,536

The invention may be utilized in numerous forms. There is shown in the drawings and will now be fully described a number of specific embodiments which it is understood are merely illustrative of the principles of the invention without limiting the invention to the embodiment shown and described. The full scope of the invention is set forth in the appended claims.

Fig. 1 shows one form of apparatus constructed in accordance with the present invention for coating articles. As shown in this figure, the article 10, which is in the form of a strip of sheet metal, is moved by a conveyor 11 in a horizontal plane in the direction of the arrow adjacent the sheet.

Along the path of travel of the sheet 10, there is provided an atomizing device 15 which atomized, disperses and deposits liquid coating material on the sheet 10. This device includes a pair of supporting structures 16—16, located on opposite sides of the path of sheet travel. Each structure 16 comprises a base 17 upon which is rigidly mounted a pair of standards 18—18 of electrically insulating material for supporting a container or tank 19 and another pair of standards 21—21, also of electrical insulating material, at the upper ends of which is affixed a crossbar 22. Two shafts 24—24 are journaled in the crossbar 22 and extend downwardly into the tank 19. Grooved pulleys 25—25 are affixed to the lower ends of the shafts 24—24 for supporting and guiding a movable, flexible discharge member 26 over a rectangular path for movement through the tanks 19 and over and in spaced relation to the sheet 10.

The member 26 may be a sheet metal belt with side surfaces 27 and 28 terminating in a discharge edge 29 presented toward and spaced from the sheet 10. Affixed to the member 26 is a flexible cable 31 which engages the grooved pulleys 25 to aid in guiding the member 26 in the desired manner and to avoid "hunting" of the member 26 as it passes over pulleys 25.

The motive power for driving the member 26 at a uniform speed is provided by one of two motors 33, which motors are supported respectively on the bases 17. This discharge-member driving motor 33 is adapted to drive shaft 34 which is made of electrically insulating material and is rotatably mounted in bearings on the base 17 and on the crossbar 22. A pulley 35 is affixed to the shaft 34 to rotate therewith. A belt 36 engages pulley 35 and a pulley 37 affixed to one of the shafts 24 to transmit power from shaft 34 to shaft 24 for moving the member 26.

As the member 26 moves through one or both of the tanks 19 liquid is supplied to it, by means hereinafter described, to form a liquid film on either or both of the surfaces 27 and 28, and the movement of the member 26 carries such film or films into the coating zone above the sheet 10. To effect atomization and dispersion of the liquid thus carried into the coating zone and the deposition of the atomized, dispersed liquid particles onto the sheet 10, an electrostatic field of appropriate strength, for example, a field having an average potential gradient of 10,000 volts per inch, is maintained between the liquid on the discharge edge 29 and the sheet 10 which region may be referred to as a coating zone. For this purpose, the sheet may be grounded through the conveyor 11 while the liquid on the discharge edge 29 is electrically connected to one terminal of the high voltage source 38 by means of the member 26 and conductor 32. The other terminal of the voltage source is grounded. In the coating zone, the aforesaid field draws the liquid on the member 26 into a series of cusps, and atomization takes place from the tips of such cusps.

Desirably, the cusps are formed and atomization from their tips is stabilized before the cusps move into the coating zone above the sheet 10. For this purpose an electrostatic field is maintained between the liquid on the edge 29 and initiating members 39—39 which are rigidly mounted on the respective insulating standards 21—21 on opposite sides of the sheet 10 and spaced from the edge 29 substantially by the same distance as is the sheet 10. This latter field functions to form the cusps and to initiate atomization of the liquid from the edge 29 just after the member 26 has moved from one of the tanks 19 and prior to its movement opposite the sheet 10. Since atomization is erratic and the particles are relatively coarse during the initial stages of atomization, the provision of members 39 permits these members to collect this undesirable coarse coating material and the sheet 10 then receives a uniform coating of relatively finely atomized liquid particles. The liquid collected by each of the members 39 is drained into a sump 40 by means of a pipe 41. The material in the sumps 40—40 may be transferred to the tanks 19—19 by any suitable means to again be used in the coating operation.

The coating material supply means, which supplies liquid coating material to the surfaces 27 and 28 along which it flows in the form of a film 57 to the edge 29, comprises one or more nozzles 42 disposed adjacent each of the surfaces 27 and 28 and rearwardly of the edge 29. These nozzles are located remote from the coating zone and in the region of the tanks 19 and are connected to pipes 43 which communicate with the tanks 19 which hold a supply of liquid coating material. A pump 44 driven by motor 33 is connected into each of the pipe lines 43 to force the liquid from the tanks 19 to the respectively associated nozzles 42. In order to maintain the pump 44 electrically insulated from ground, the belt 54 is made of electrically insulating material. A valve 46 may be provided in each of the pipes 43 to control the quantity of liquid fed to the nozzles 42. Also, if desired, further control may be obtained by by-passing some of the liquid in the pipe 43 prior to its reaching the nozzles 42. This may be accomplished by a pipe 47 connected between pipe 43 and the tank 19. A valve 48 may be provided in the pipe 47 to control the amount of liquid that is by-passed.

Where it is desired to atomize in the coating zone more liquid material than can conveniently be carried thereto on the member 26, nozzles 49 may be provided for supplying additional liquid material. The nozzles 49 are located in the coating zone and disposed adjacent the surfaces 27 and 28 of member 26. The nozzles 49 are connected to pipes 50 which are in turn connected to a suitable supply of liquid coating material. Valves 51 may be provided in the pipes 50 for controlling the amount of liquid fed to the nozzles 49. Pressure for moving liquid to the nozzles 49 for distribution to the discharge edge 29 may be obtained by means of a pump, by means of air pressure within the storage tank for the liquid or by gravity. This liquid feed mechanism is electrically insulated from ground as is the apparatus connected to the nozzles 42. Since the nozzles 49 are located above the edge 29 and time is required for the liquid they discharge to flow down the surfaces 27 and 28 to the discharge edge, the nozzles associated with each transverse stretch of member 26 are desirably located nearer to that side of the coating zone from which such stretch enters than to the side from which it leaves. Whereas Fig. 1 shows the simultaneous use of both nozzles 49 and 42 it is to be understood that either set may be used independently where such use is desired.

The tanks 19 may be provided with drip troughs 52 affixed to the exterior walls at points where the member 26 leaves such tanks. These troughs function to capture the excess liquid material supplied to the member 26 and are inclined downwardly toward the tanks to permit this excess liquid to drain back into the tanks for further use.

In Fig. 1, the surface being coated is moved in a horizontal plane; however, it is understood that the surface to be coated may be positioned in other planes.

While the apparatus shown in Fig. 1 is best suited for coating continuous surfaces, it is desirable to modify it when the surfaces are discontinuous by replacing members 39—39 with device 60. Fig. 2 is a sectional schematic diagram showing such modification. To maintain stability of the atomized pattern when no sheet is opposite the discharge edge 29, the device 60 is disposed between tanks 19—19 and beneath member 26. The device 60 includes member 61 which is sloped towards its center where it communicates with a pipe 62. This arrangement insures that as the discharge member 26 moves from tank 19 across the sheet 10 atomization will be established by that part of initiating member 61 extending beyond the sheet as in Fig. 1 and operation will continue unaffected whether the sheet is present or not. Material atomized to member 61 will be returned to sump by the pipe 62 to be reclaimed.

The voltage source 38 utilized may provide full-wave or half-wave rectification or provide unrectified A. C. In general, the steadier the potential employed the better defined will the deposited pattern be and the more uniform and satisfactory will be the degree of atomization. The effectiveness of the electrostatic field in causing atomization and in promoting deposition of atomized material will vary in the same sense as the applied voltage, and it is therefore desirable in most instances to use voltages approaching the highest voltage consistent with freedom from possible sparking. Voltages which create between the atomizer and the article an average potential gradient of 8,000 to 12,000 volts per inch are very satisfactory. In most instances I prefer to space the discharge edge at about ten inches from the surface being coated and to employ a potential of about 100,000 volts.

The invention can be practiced without regard to the polarity of the potential maintained on the discharge member or article. In coating, either the discharge member or the article can be grounded; but in most instances it will be more convenient to ground the article. Articles of insulating character can in many instances be coated without the necessity for a backing electrode so long as their surfaces are maintained at a different potential from the atomized material.

Fig. 3 shows another apparatus arranged to apply coating material to one side of flat panels. The panels 71 are supported from the crossbars 72 of a table top conveyor and are carried by it in the direction of the arrow. The conveyor moves forward in the direction of the arrow along the track 73 and returns along track 74 which is located on the floor. On its return path the conveyor is covered by a shield 75. The conveyor carries the panels past two electrostatic atomizers 76 as it moves forward. These atomizers which embody conical heads are similar to those previously known and therefore will only be briefly described here. They are supported from the insulated bar 77 suspended between the two upright floor supports 78 and are connected to one terminal 79 of a high voltage supply 80 by a conductor 81. The other terminal of the supply and the conveyor are grounded as at 82 and 83 respectively. When the high voltage is applied, an electrostatic field is thus established between the heads 84 of the atomizers and the panels on the conveyor. A pair of motors 85, one at each end of insulated bar 77, are coupled to the heads of the atomizers by an insulated shaft which runs internally of the support 78 and the heads are thus caused to rotate about their respective axes.

Supported from the conveyor side rails is a stand-in electrode in the form of a tray 86 which in its stand-in position is situated immediately below the spray heads. Coating material is fed by a pumping system (not shown) to the heads by means of insulating tubing 87. This material flows through the atomizer and becomes distributed on the internal surface of the conical head as a film. This film at the forward edge of the cone is exposed to the action of the electrostatic field and by it is atomized into fine particles which are then projected toward the opposite terminal of the field.

The means by which the tray is supported on the conveyor can be seen best in Fig. 4. In this figure the conveyor side rail 88 has two channels or tracks 73 and 89. In one of these tracks 73, the conveyor chain and rollers 90 travel and carry the conveyor cross bars 72 to which the carriers for the panels 71 are attached. In the other track a set of wheels 91 travel which are attached to cross bar 92. This cross bar is bent upward at the ends to supply support 93 for tray 86. Four such rods carry the tray 86 above the conveyor side rails. With this arrangement it is evident that the tray 86 can move back and forth along the conveyor supported by its wheels 91 while the conveyor in its track 73 moves the panels in the direction of the arrow beneath the tray.

In its stand-in position, as shown in Fig. 3, the tray 86 rests with its stop 94 against the spring bumper 95 and is held in this position by weight 96 attached to the tray by cord 97. Against the restoring action of this weight the tray can be moved in the direction of the arrow until its front support rod 93 passes over magnetic stop 98, which prevents its return until such return is desired. As the tray moves into this position the sprays from the atomizers transfer themselves from the tray to the parts on the conveyor.

Figure 7:
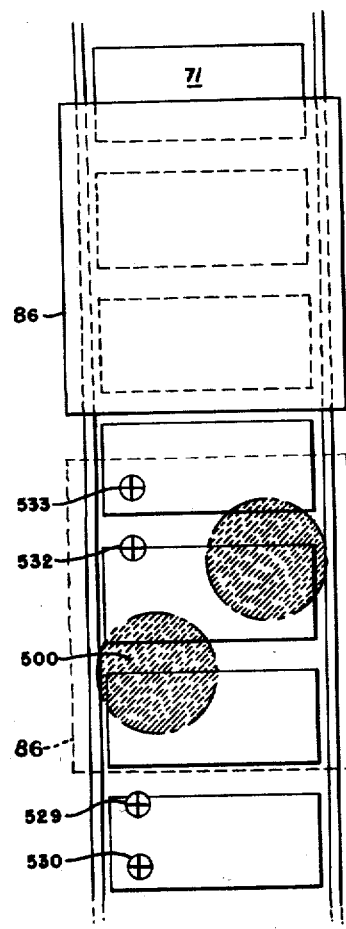

In Fig. 7 the tray is shown in dotted lines in its normal or stand-in position beneath the atomizers. The two shaded circles 500 represent the intersection of the atomized material with the plane of the conveyor. The full line showing of the tray depicts it as advanced along the conveyor to its non-operative position where it is held by magnetic stop 98.

Referring again to Fig. 3, two light source-photocell arrangements are shown as arranged to control the operation of the unit. The one 99—100 (see exact location of light beams as 529 and 530 in Fig. 7) is arranged to project a light beam from source 99 through the conveyor onto mirrors 101 and into photo receiver unit 100. The other 102—103 projects a beam of ligth from 102 through the conveyor onto mirrors 104 and back through the conveyor to photo receiver 103. The positions at which these beams of light pass through the conveyor are shown as 532 and 533 in Fig. 7.

The beam of each photo cell device should be sufficiently large in cross section that the light beam will not be interrupted by the conveyor slats 72 as they pass along the conveyor path without parts in position.

Figures 4, 5:
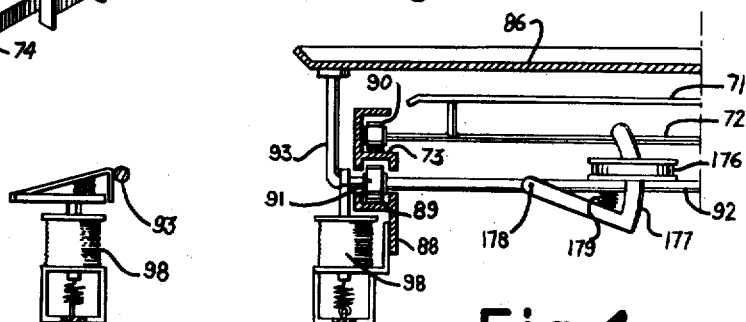

Referring to Fig. 4 there is shown a magnetic means by which the tray 86 can be connected to the conveyor so that the tray can be moved from stand-in to inoperative position. A coil 176 is attached to the tray support rod 92. A magnetic core 177 is arranged in this coil and is pivoted to the support rod at 178. The core 177 is therefore arranged to pivot in and out of coil 176 as it is energized and deenergized. Its movement out of the coil is assured by the spring 179 biasing it downward. When the core is down and the coil not energized the conveyor bar 72 moves freely over the coil 176. However, when the coil is energized, the magnetic action moves the core upward into the position shown where it intercepts the conveyor cross bar and essentially affixes the tray to the conveyor. As the conveyor moves forward it therefore carries the tray with it, and thus it is moved from the dotted line to the full line position shown in Fig. 7. When the tray arrives in the inoperative position, a limit switch 105 (Fig. 3) is arranged to deenergize the coil 176 and disconnect the tray from the conveyor by dropping core 177. The tray falls back against stops 98 and is held by them in its new position.

Figure 6:
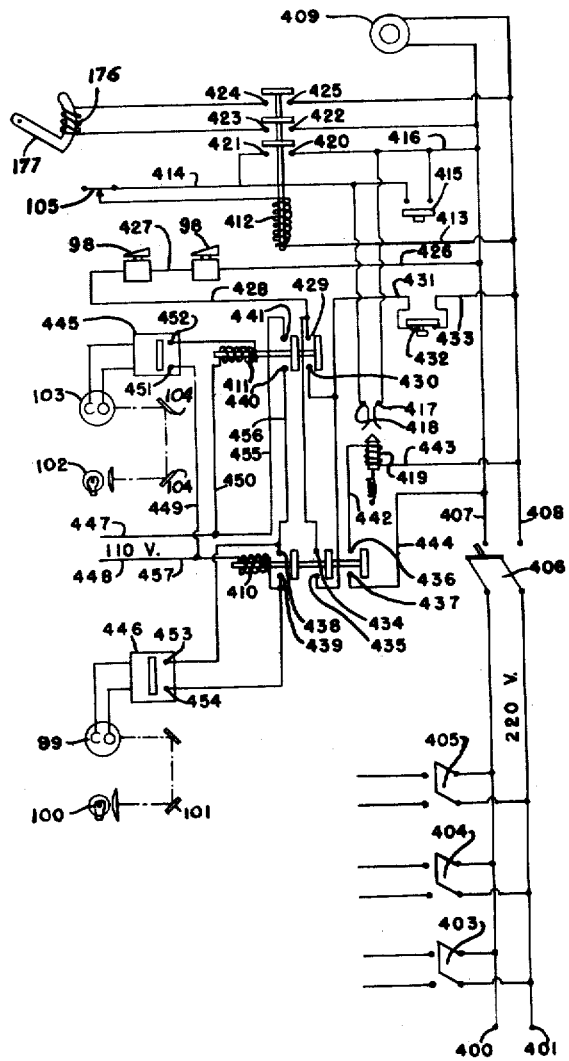

Referring now to Fig. 6 the main voltage supply line 400 and 401 supplies power to the high voltage transformer 80 by way of switch 403; to the atomizer rotator motors 85 by way of switch 404; to the fluid supply pump (not shown) by way of switch 405; and to the rest of the apparatus by way of switch 406. Conductors 407 and 408 lead directly to the conveyor drive motor 409. The circuits are centered primarily about the photo cell activated magnetic contactors 410 and 411 and the manually activated magnetic contactor 412. These relays all have their contacts normally open when their coils are not energized.

The coil of contactor 412 is connected to voltage supply lines 407 and 408 by conductor 413 at its one end and by normally closed microswitch 105, conductor 414, normally open momentary contact switch 415 and conductor 416 at its other end. The contacts 417 and 418 of normally open magnetically operated momentary contact switch 419 and contacts 420 and 421 of contactor 412 are in parallel with this manually operated momentary contacting switch 415. Thus the closing of either pair of the contacts of switch 415 or contacts 417—418 of switch 419 will activate coil of contactor 412 and close its contacts. It is held activated by virtue of contacts 420—421 and can be deenergized by opening microswitch 105.

By way of contacts 422—423 and 424—425 on the contactor 412 the coil 176 of the connector is energized from the 220 volt source. When the contactor 412 is energizedf then the coil 176 is energized and core 177 is raised so that it intercepts the bars 72 of the conveyor and thus causes tray 86 to move along with the conveyor.

The magnetic stops 98, one on either side of the conveyor, are energized from lines 407 and 408 by way of conductors 426, 427, 428, contacts 429 and 430 of contactor 411, conductor 431, normally closed switch 432, and conductor 433. Contacts 434 and 435 of contactor 410 are in parallel connection to contacts 429 and 430 of contactor 411. Thus when either of the contactors 410 and 411 are energized, the magnetic stops are connected to the lines 407 and 408 to be energized and raised into position to stop tray 86 in its inoperative position.

By way of conductor 443 at one end and by way of conductor 442, contacts 436 and 437 of contactor 410, and conductor 444 at the other, coil of momentary contact switch 419 is connected to lines 407 and 408. Thus when contactor 410 is energized closing contacts 436 and 437 the plunger of switch 419 moves forward so that its metal covered tip connects 418 to 417. It then returns to a normal position in the coil where it is out of contact with these terminals. Contacts 417 and 418 are thus momentarily closed each time contactor 410 is energized.

Contactor 411 is energized from a 110 volt circuit with leads 447 and 448 by way of a circuit comprising conductors 449 and 450 and the contacts of the photo relay 445. This relay is arranged so that its contacts 451, 452 are open whenever the light from light source 102 passes uninterrupted to cell 103 by way of mirrors 104. If this beam is interrupted on either path through the conveyor contacts 451—452 are connected and contactor 411 is thus activated.

Contactor 410 is connected to the 110 volt supply 447—448 by a circuit composed of lead 455, terminals 440—441 of contactor 411, lead 456, terminal 438—439 of contactor 410 on one end of its coil and conductor 457 on its other end. A pair of contacts 453—454 are arranged to be closed when the light beam from light 100 to photo cell 99 is interrupted. If contactor 411 is energized and contacts 440—441 connected, then interception of the beam to photo cell 99 will close contacts 453—454 and thus energize contactor 410. Once contacts 438—439 are closed contactor 410 remains energized until contactor 411 is deenergized and connections 440—441 opened.

With this electrical arrangement and the light beam passing through the conveyor in the positions indicated in Fig. 7 as 530, 529, 532 and 533 the apparatus functions as follows: With the conveyor empty and tray 86 in the stand-in position as shown in Fig. 3 and in dotted lines in Fig. 7, the light beam from light 102 to photo cell 103 will be intercepted by the tray, terminals 451 and 452 will be shorted and contactor 411 will be energized. Because terminals 429 and 430 are closed the magnetic stops 98 will be energized and moved to "up" position when the switch 406 is closed to start the conveyor.

Under these circumstances the atomizer rotators are started by closing switch 404, the fluid pumps are started by switch 405 and the high voltage placed on the atomizers by closing switch 403. Coating material from the supply will then be pumped to the atomizers and formed into a film on the cones 84. Under the action of the electrostatic field existing between the tray in its stand-in position and the heads this material will be atomized into the space in front of the cone and will be precipitated onto the tray. When all atomizers are functioning properly parts to be painted can be placed on the conveyor.

As these parts are carried along the conveyor the light beam 530 and 529 will be intercepted. Since contacts of relay 411 are closed, the light beam 530 being intercepted closes terminals 454 and 453 and energizes contactor 410 to close all its contacts. Terminals 436 and 437 being closed energize contacting switch 419 and this momentarily connects terminals 417—418. This energizes contactor 412 and closes all its contacts including 424—425 and 422—423. This in turn energizes coil 176 and pulls core 177 up into the path of the conveyor cross bar 72 so that as the next bar comes by, the tray will be connected to the conveyor and moved forward with it. As the tray moves, the sprays, which were initiated with the tray in stand-in position, transfer themselves to the parts which follow the tray into and through position beneath the heads.

The tray advances until its forward support 93 passes over stop 98 and contacts switch 105. As 105 is opened, relay 412 is deenergized, core 177 drops downward in coil 176 and the tray is disengaged from the conveyor. Under action of weight 96 the tray drops back against stops 98 with its support bar 93 in the position shown in Fig. 5. Spraying of the parts 71 will proceed as long as desired. The spacing of parts on the conveyor is such that at least one of the legs of each retroverted light beam will always be interrupted and all functions will remain normal.

If a single conveyor support comes along on the conveyor without a part, light beam legs 530 and 529 will be opened, relay 446 will operate to open contacts 454—453 but relay 410 will not be deenergized.

As the blank conveyor support moves onto light beams 532 and 533 they become uninterrupted and contacts 451—452 open to deenergize contactor 411. However, since a following part has interrupted light beam 530 contacts 453—454 are closed and contactor 410 remains closed. As soon as the beam 532 is again interrupted the relay 411 will close again and operation will be normal.

If, however, four successive supports are without parts, photo beams 530 and 533 will be open as the last part before the blank space clears legs 533 and before the first part after the blank occludes 530. When both beams are unoccluded both relays 445 and 446 will be open and contactors 410 and 411 will be deenergized so their contacts will open. Because of this, stops 98 will be deenergized and tray 86 will return under the action of weight 96 to the position shown in Fig. 3. This return of the tray to stand-in position maintains the electrostatic field and causes atomization to continue until parts again approach. As soon as the conveyor supports again carry parts, one of them will be carried into intercepting position with light beam 530 and the process restarted. Relay 446 closes; contactor 410 closes; momentary contactor 419 acts to close its contacts and thus close contactor 412; the tray advances along the conveyor under the engagement of core 177 with the conveyor and eventually reaches switch 105 which disengages it from the conveyor and allows it to drop back against stops 98. The process then continues as above described.

If during normal operation it is desired to divert the spray from the articles, switch 432 can be opened and the tray returned to stand-in position. It will remain there so long as the conveyor is full of parts. It can be again moved into inoperative position by closing switch 415 to close contactor 412.

The apparatus of Fig. 3 is thus completely flexible. It will work automatically or manually as desired. If the current source to the photo cell lights is disconnected so that these lights are out, the contactors 410 and 411 remain closed and the operation can be carried on in a completely manual fashion by using switches 432 and 415 to control the position of the tray.

Figures 8, 9:
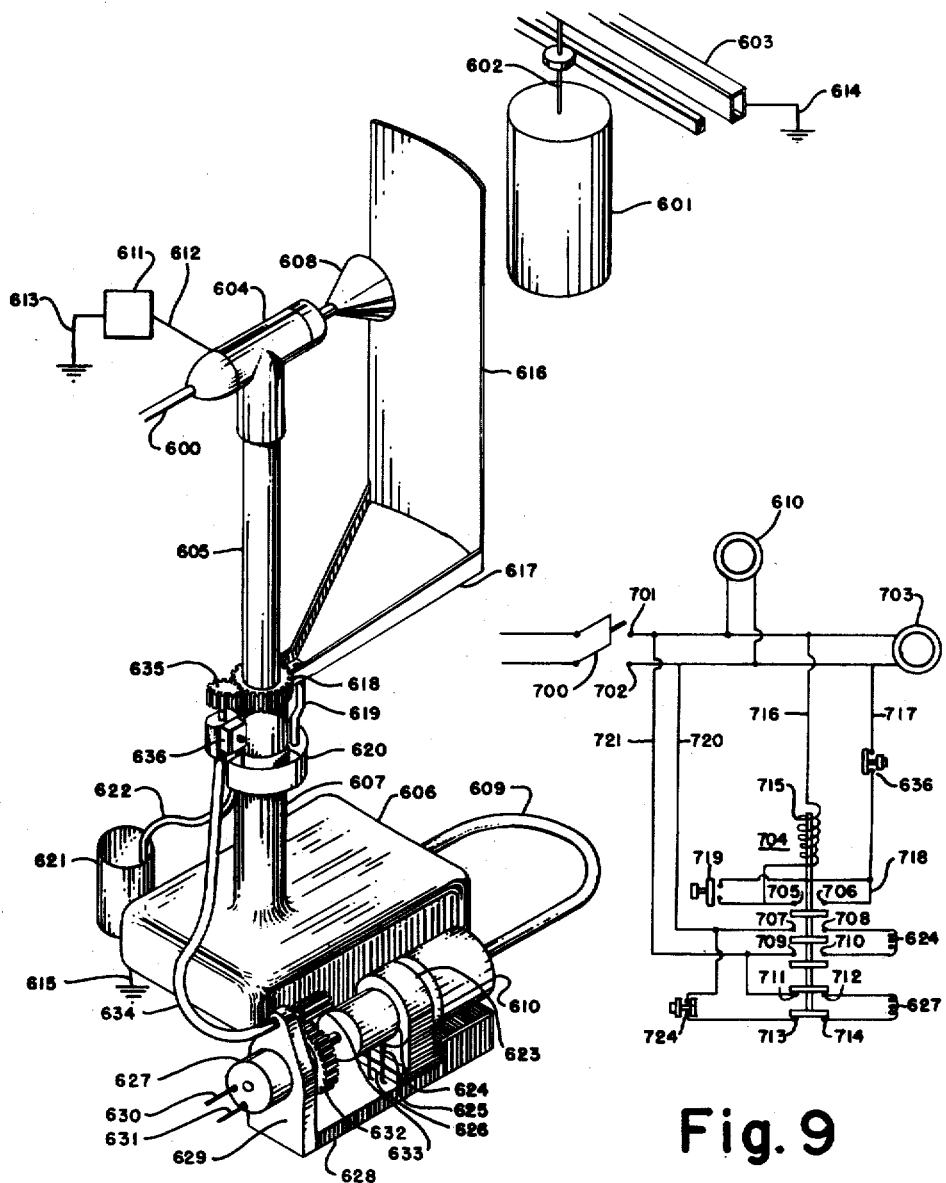

Another form of this invention is shown in Fig. 8 where the apparatus as used with one atomizing head is shown. In this figure the spray is being applied to the vertical surface of an object supported from a conveyor. The object 601 shown here as a cylindrical container is supported by a hook 602 from an overhead conveyor 603. Located alongside of the conveyor and spaced from the article on the hook is an atomizing head 604 similar to the heads 73 of Fig. 3. The head is supported on the hollow insulator 605 attached to base support 606. Running centrally of this hollow insulator and extending from the top of the column 607 of base 606 to the atomizing head 604 is an insulating shaft which is not visible. This shaft is bearinged at each end and is geared at its upper end to the cone 608 of the atomizer and connected at its lower end to flexible shaft 609. By means of this connection motor 610 can turn the cone of the atomizer.

The atomizing head is maintained at high electrical potential by being connected to a high voltage supply 611 by conductor 612. The other end of the supply is grounded as at 613 as is the conveyor 603 at 614. The base of the atomizer support 606 is likewise grounded as at 615. An electric field is thus maintained between the atomizer and all adjacent grounded parts such as the object on the conveyor.

A stand-in electrode in the form of a curved sheet 616 is arranged on support arm 617 so that in its normal position, as shown, it will be opposite the atomizing head. It is a conductor and is grounded, so a field will exist between it and the atomizer. The support arm 617 is bearinged to rotate about the column 607 and has a gear 618 externally of this bearing. The entire arm assembly is spring biased by a coil spring, not shown, so that it occupies or returns to the position shown unless held displaced from this position. The support arm is in the form of a trough having a drain 619 arranged to move about collector 620 which is arranged about the column 607 and which in turn is connected to the sump 621 by pipe 622.

Motor 610 is arranged to drive a speed reducer 623 at its end opposite to that one connected to flexible shaft 609. The output of the motor is thus reduced to several revolutions per minute. The speed reducer is coupled to and rotates a cylindrical electromagnet 624 which can be energized through brushes 625—626 and a commutator not shown. A similar electromagnet 627 is located on the same axis as 624 but is displaced axially from it and is fixedly attached to the frame 628 by bracket 629. This electromagnet is energized through connections 630—631.

Mounted between these two magnets and arranged to rotate and slide axially on a bronze shaft is a spur gear 632 which is made of magnetic material. This gear is meshed with another gear 633 that in turn drives flexible shaft 634. The other end of this shaft is affixed to the column 607 and carries a gear 635 which meshes with gear 618 attached to the support arm 617. When voltage is applied to the brushes 625—626 and magnet 624 energized, the gear 632 is attracted to and held in contact with the magnet face. It is thus rotated and causes gear 618 to rotate by way of shaft 634. The resultant swinging of arms 617 carries sheet 616 out of its position opposite the atomizer. A small microswitch 636 affixed to the column 607 is contacted by the spout 619 of arm 617 as it rotates about the column. This switch reenergizes moving magnet 624 and energizes stationary magnet 627; gear 632 ceases to rotate; moves from face of magnet 624 to magnet 627 and is locked into position against that face. In this position it acts as a brake to hold rotating arm 617 in inoperative position. When the magnet 627 is deenergized and the gear 632 free to rotate, the arm 617 and shield 616 will be returned to the position shown by the spring mentioned above.

Fig. 9 is the electrical circuit associated with the apparatus of Fig. 8. The main 220-volt supply is brought in through switch 700 to lines 701 and 702. These lines lead directly to motor 610 and conveyor motor 703. A contactor 704 having normally open contacts 705—706, 707—708, 709—710 and normally closed contacts 711—712 and 713—714, has its coil 715 connected to line 701 and 702 by way of conductors 716 on its one end and contacts 705—706, conductor 718, switch 636 and conductor 717 on its other. A normally open momentary contact switch 719 is in parallel with contacts 705—706 and thus serves when closed to energize coil 715 and activate contactor 704.

Electromagnet 624 is connected to the supply line by leads 720—721 and contacts 707—708 and 709—710 of contactor 704. Electromagnet 627 is connected to the source by conductors 722—723 connected to conductors 720—721, the normally closed switch 724 and contacts 711—712 and 713—714, has its coil 715 connected to line 701 and 702 by way of conductors 716 on its one end and contacts 705—706, conductor 718, switch 636 and conductor 717 on its other. A normally open momentary contact switch 719 is in parallel with contacts 705—706 and thus serves when closed to energize coil 715 and activate contactor 704.

Electromagnet 624 is connected to the supply line by leads 720—721 and contacts 707—708 and 709—710 of contactor 704. Electromagnet 627 is connected to the source by conductors 722—723 connected to conductors 720—721, the normally closed switch 724 and contacts 711—712 and 713—714 of contactor 704. Since contacts 711—712 and 713—714 are normally closed, electromagnet 627 will be energized when the contactor coil 716 is not energized.

In operation the apparatus of Fig. 8 functions as follows: High voltage is supplied to the head 604 by energizing voltage pack 611. Switch 700 is closed to start the conveyor motor 703 and the rotating motor 610. The fluid pump is then started so coating material is fed to the atomizing head 604. This material will spread over the inner surface of cone 608 in a film whose forward edge will be in the field between the head and the opposed stand-in electrode 616. Under the action of this high voltage field coating material will be atomized from the head and collected upon the screen 616.

Material atomized onto the stand-in electrode 616 will run into trough 617 pipe 619 and collector 620. From there it will be returned to the sump for reuse.

As soon as the spray stabilizers, parts can be hung on the conveyor for painting. As the part comes adjacent the head the operator pushes switch 719 to energize contactor 704 and magnet 624. By gear 632, drive 634 and gear 618, the screen is rotated out of stand-in position. When the spout 619 of the screen contacts the switch 636 the contactor 704 is deenergized, magnet 624 disconnected from and magnet 627 connected to the voltage source so that the gear 632 shifts from the moving magnet 624 to the fixed magnet 627 and thus locks the screen in inoperative position. The spray will then be diverted to parts on the conveyor which will then be coated with the atomized material. By using a rotating hook the parts rotate past the head and thus their entire exterior surface becomes coated.

When it is desired to stop the coating operation, the button 724 is held open to release the gear 632 to allow the sheet to again move into its stand-in position. With the sheet in this position the fluid pumps, the high voltage field and the rotator can be stopped without spoiling any parts on the conveyor.

Whereas, the stand-in electrode shown in Fig. 3 consists of a single continuous element, it is sometimes desirable to construct the stand-in electrode of two elements separated by an appropriate space. The primary advantage of such a construction arises from the fact that its use permits the apparatus of this invention to be set into motion by the absence of a single part from the conveyor and hence allows a greater flexibility than the modification shown in Fig. 3. When this type of stand-in electrode is used the control circuit and associated switches must be slightly modified.

Figure 10:
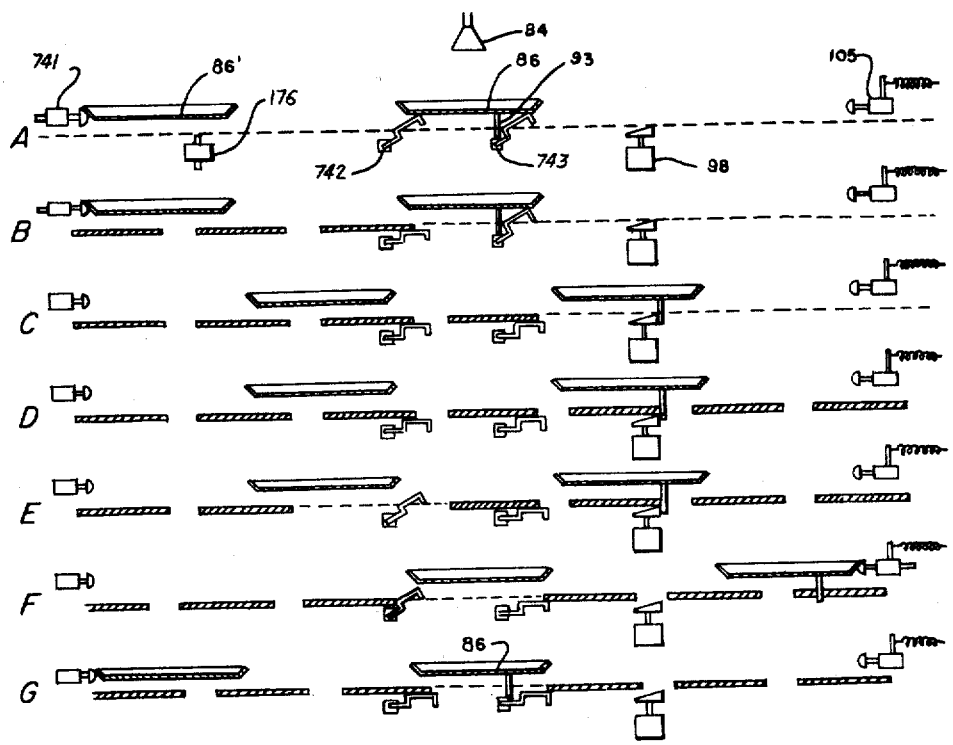

In Fig. 10 a series of schematic diagrams (a through G) are arranged to illustrate the operation of the equipment when a double or split stand-in electrode is used.

In this figure the stand-in electrode is shown as comprising two elements 86 and 86' each of which are similar in construction to the stand-in electrode of Fig. 3. These two elements are rigidly attached to each other and to a common set of carrier bars 92 upon which they are separated from each other by a space corresponding to the width of a part on the conveyor. These two elements form the complete stand-in electrode which is supported from the conveyor in the same manner as that shown in Fig. 3. Instead of the two photocell arrangements shown in Fig. 3 two 2-way switches 742 and 743 are located beneath the conveyor and are in position to be operated by parts on the conveyor. When a part is placed on the conveyor support and moved along the conveyor both of these switches will be intercepted by the part and will be moved from their normal "up" position to a "down" position.

Stop 98 located along the conveyor in a position to intercept arm 93 attached to the stand-in electrode is identical in construction and operation to the like numbered part in Fig. 3 and Fig. 5.

Figure 11:
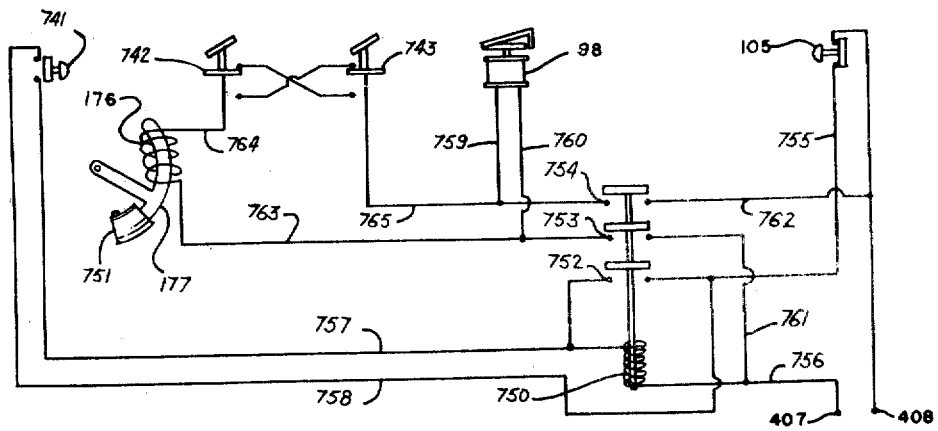

Connector coil 176 is attached to the stand-in electrode in exactly the same manner as described in Fig. 4 and serves to connect the stand-in electrode to the conveyor when such connection is desired. This particular connecting device differs from that shown in Fig. 4 in that it has built into it a dashpot time delay device which retards the downward or disconnecting motion of its armature 177. Such an arrangement is seen in Fig. 11 where the armature 177 is shown as extending into a cylinder 751 which serves as the dashpot or delay device. The connector coil 176 and its associated armature 177 is otherwise similar to that described in Fig. 4. A normally closed limit switch 105 similar to that of Fig. 3 is located along the conveyor advanced in the direction of motion of the conveyor from the stand-in electrode 86. An additional normally open limit switch 741 is located along the conveyor ahead of the stand-in electrode.

The arrangement of these elements and the manner in which they operate can be understood from reference to Fig. 11. Leads 407 and 408 correspond to the similar connections in Fig. 6 and represent a supply of 220 A. C. A magnetic contactor 750 with normally open contacts 752, 753 and 754 is arranged to be operated from this voltage source. The coil of contactor 750 is connected to this source by normally closed switch 105, lead 755, contact 752 and lead 756. A normally open switch 741 is connected across the contacts 752 of the contactor by leads 757 and 758. Stop 98 is connected by leads 759 and 760 to contacts 754 and 753 of the contactor and by way of leads 761 and 762 to the voltage supply 407 and 408. The coil 176 of the connector is connected to the voltage source 407 and 408 by way of lead 761, contact 753, lead 763 on the one hand and lead 764, switch 742, switch 743, lead 765, contact 754, and lead 762 on the other hand. With these connections, closing switch 741 even momentarily results in contactor 750 being energized and all of its contacts are closed. When the contactor 750 is energized, coil of the stop 98 is energized and coil of the connector 176 is energized providing either but not both of the switches 742 and 743 is in a down position. Opening switch 105 will deenergize the contactor 750 and hence deenergize all of the equipment. its normal or stand-in position. Switches 742 and 743 be energized and its armature raised when one of the other of switches 742 or 743 are in the down position and will not be energized when these two switches are both in the up position or both in the down position.

Referring to Fig. 10 the manner in which this equipment operates can be understood. Each step in the operation of the equipment is shown schematically in the sequential drawings labeled A, B, C, D, E, F, and G. Step A shows the equipment in its normal position when no parts are on the conveyor. Switch 741 is closed by the stand-in electrode 86 which occupies in this drawing its normal or stand-in position. Switches 742 and 743 are both up since no parts are on the conveyor. The contactor 750 is closed and the stop 98 is energized and in "up" position.

The atomizing heads 84 in this modification, unlike those shown in Fig. 3, are located in a straight line across the conveyor at the position shown by head 84 in Step A of Fig. 10. In this position, heads 84 are located directly over the portion 86 of the stand-in electrode as it occupies its normal or "stand-in" position. With the stand-in electrode in this position a field is established between the head and the element 86 of the stand-in electrode, coating material is fed to the atomizing head and the head set into rotation after the manner previously described. Atomization is thus initiated.

When parts are placed on the conveyor and moved into the position shown in Step B switch 742 is depressed, connector coil 176 energized and the stand-in electrode connected to the conveyor. The stand-in electrode moves along with the conveyor as the parts progress to the right as indicated in Step C. As the parts and stand-in electrode move further, switch 743 will be depressed, coil 176 of the connector deenergized and after a delay governed by the dashpot 751 the stand-in electrode will be disconnected from the conveyor. Being biased toward its normal position in the manner described in connection with Fig. 3, the stand-in electrode once disconnected from the conveyor will drop back against stop 98 and will be held in this position.

Step D represents this position of the equipment, and as can be seen parts passing under the atomizers 84 will now be coated with atomized material from head 84 since the opening in the stand-in electrode provides access of the spray to the parts. This normal operating condition will exist so long as the conveyor continues to be completely loaded with parts.

If, however, a support on the conveyor is left unloaded, the absence of this part when the empty hook arrives at the position shown in Step E will allow switch 742 to move into its "up" position to energize coil 176 and thus connect the stand-in electrode to the conveyor. The stand-in electrode will be moved to the right with the conveyor with the second element 86' of the stand-in electrode covering the empty support. When the stand-in electrode moves into position shown in F its edge will contact switch 105 which deenergizes the entire system by virtue of disconnecting contactor 750. Because of this, coil of contactor 176 will be deenergized and after reasonable delay plunger 177 will fall disconnecting the stand-in electrode from the conveyor. This happens even though switch 743 is still in the down position. Since contactor 750 has opened, stop 98 will also be in the down position and the stand-in electrode will return quickly under the biasing action of the weight 96 to its normal or stand-in position as shown in Step A, of Fig. 10.

As soon as the stand-in electrode touches the switch 741 the system will be reenergized and since switch 742 is still in the up position and 743 in the down position, coil 176 will be energized and connect the stand-in electrode to the conveyor. The stand-in electrode with its element 86 now covering the empty space on the conveyor will move to the right with the conveyor. As soon as the part following the vacant support arrives at the position shown by Step G, switch 742 will be depressed and since 743 is in the down position the coil 176 will be deenergized. The armature 177, however, because of the delay in its operation caused by dashpot 751, will not immediately disconnect the stand-in electrode from the conveyor. This delay is sufficient to permit the conveyor to advance so that the vacant space allows switch 743 to move into its up position to again energize coil 176 and maintain the connection of the stand-in electrode with the conveyor. This arrangement of parts of the apparatus is then analogous in every respect to that shown in Step B of Fig. 10 and the operation will proceed in the manner described above to condition D of Fig. 10 which is the normal or operating condition. The empty space on the conveyor has thus been accommodated and because the second element 86' of the stand-in electrode moved into stand-in position replacing the empty space beneath the head 84 atomization was maintained in a stable condition.

Should two or more successive parts be missing, or should the part immediately to the right of the electrode portion 86 in step G be the last of a series being coated, there will be no following part to move the switch 742 to the depressed condition shown in step G, the connector coil 176 will remain energized, and the electrode will continue to move with the conveyor until switch 743 is cleared. When this event occurs, the connector coil will be deenergized to sever the operative connection between the electrode and the conveyor, and the electrode will return to the condition shown at A, where it will remain until switch 742 is again depressed by a part approaching coating position.

It will be noticed that it will be necessary to mount switch 105 on a spring type mounting so as to permit the switch to move along with the conveyor part during the delay occasioned by the armature 177 returning to its disconnect position.

Referring now to Figs. 12, 13, and 14 of the drawings, there is shown a grounded conveyor 110 for moving articles 111, such as ironing boards, in the direction indicated by the arrow 112, successively through two coating stations indicated generally at 113 and 114. The conveyor shown is an overhead, monorail type and includes a plurality of pendants 115 which are adapted to support article hooks 116 which in turn support the articles 111.

On one side of the conveyor 110 at the coating station 113, there is disposed an atomizer assembly indicated generally by the numeral 117, which includes a group of three atomizers 118. Each atomizer 118 includes a conically shaped discharge portion or head 119 connected to a hollow shaft (not shown) which is rotatably mounted on body portion 120. An opening is provided in each cone 119 at its apex which opening is connected through the hollow shaft to a liquid supply line 125. The opposite end of each line 125 is connected to a pump unit 126 which is supplied with liquid coating material from a container 127 by means of a flexible pipe 128. The pump 126 is of the positive displacement type and is energized from conduit 131 which is connected to a source of electrical energy not shown.

Besides the atomizers 118, the atomizer assembly 117 includes sleeves 132 and 133, motor 136, and brackets 137 and 138. The sleeves 133 are of electrical conducting material and interconnect the atomizers 118; whereas, the sleeves 132 are of electrically insulating material and function to insulate the atomizers 118 from ground. The assembly 117 is adjustably connected to standards 134 for moving the atomizers into various different positions in a vertical plane. The standards 134 are adjustably connected to the bases 135 to permit movement of the atomizers 118 laterally relative to the conveyor 110. Under operating conditions the assembly 117 is fixed relative to the standards 134, and the standards 134 are fixed relative to the bases 135 so that the transverse dimension of the spray from the three atomizers 118 at the point of intersection with the path of article movement is as great as the greatest dimension of the articles 111 and the atomizers 118 are sufficiently far from the articles 111 to avoid sparking. The atomizer heads 119 are rotated by gearing the hollow shaft to which they are connected to a rotatable shaft (not shown) which is mounted internally of the sleeves 132 and 133 and which is connected to the motor 136. That portion of the rotatable drive shaft which passes through the sleeves 132 is desirably of insulating material.

The atomizers 118 are maintained at a high electrical potential for example 100,000 volts by means of a conductor 140 which is connected between one of the sleeves 133 and one terminal of a source of high voltage 141, the other terminal of which is grounded.

A backing electrode 145 shown as an endless flexible conducting sheet is positioned on the opposite side of the conveyor 110 from the atomizers 118 and is movably supported on upper roller 146 and lower roller 147. Rollers 146 and 147 are rotatably mounted on standards 148 which are affixed to the bases 135. Since the bases 135 are movable relative to the conveyor 110 the backing electrode 145 may be positioned in any desired position relative to the articles 11 being coated. While the standards 148 are shown as rigidly fixed to the bases 135, it is to be understood that they may be adjustably mounted similarly to the standards 134. The lower roller 147 is connected to a motor 150 through gear box 151 for moving the electrode 145 on the rollers 146 and 147. Adjacent to and in engagement with the electrode 145 there is provided a spring biased scraping element 152 (Fig. 14) which removes any coating material accumulating on the electrode 145. Immediately below the electrode 145 there is provided a trough 153, for collecting the coating material removed from the backing electrode. The trough 153 is provided with an opening 154 by which it may drain into sump 155.

The size of the backing electrode should be such that when it is combined with the articles passing it at a coating station the aggregate surface area of the backing electrode and the articles presented to the spray at the coating station is at least as large as the cross sectional area of the spray of coating material at the point of its intersection with the path of article movement. The positioning of the backing electrode relative to the articles moving past it at a coating station and the electrical potential of both the backing electrode and the articles should be such that both the backing electrode and the articles have substantially the same electrical effect on the charged spray.

The apparatus at the coating station 114 is the same in all respects to the apparatus at the coating station 113 except that the backing electrode and the atomizer structure are on opposite sides, and therefore its description will not be repeated.

In the operation of the apparatus just described, first the voltage is applied to the atomizers 118, then the rotation of the atomizers is initiated by energizing the motor 136, and next the pump 126 is energized to feed coating material to all of the atomizers. When the spray patterns from the atomizers 118 to the electrodes 145 are stabilized, the conveyor 110 is energized to move the articles 111 successively through coating stations 113 and 114. The apparatus at each coating station is so arranged and the voltages are so adjusted that a relatively uniform coating is applied to the entire surface of each article. Any coating material that is not deposited on the articles 111 is collected by the electrodes 145 from where it is removed by the scrapers 152 into sumps 155 by means of troughs 153.

Under such apparatus arrangement and voltage adjustments, the aggregate spray pattern produced from the three atomizers 118 at each coating station, as mentioned previously, should be such that its greatest dimension transverse to the direction of article movement is at least as large as the greatest dimension of the articles 111 transverse to the direction of movement. As a result, under such operating conditions, coating material will be accumulated by the backing electrode only when the pointed ends of the ironing boards 111 pass the spray from the atomizers 118 and during the time that the gaps between articles are opposite the spray.

Figure 15:
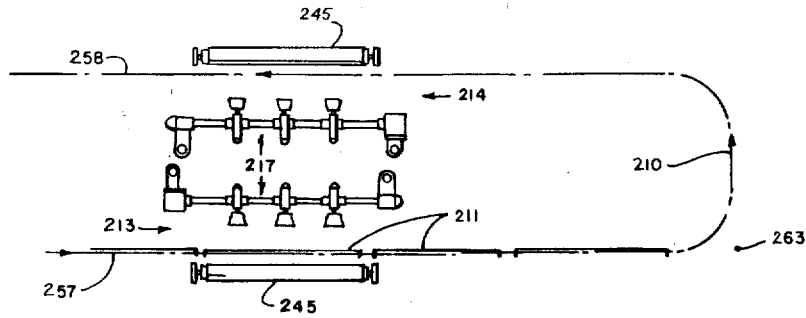
Figure 16:
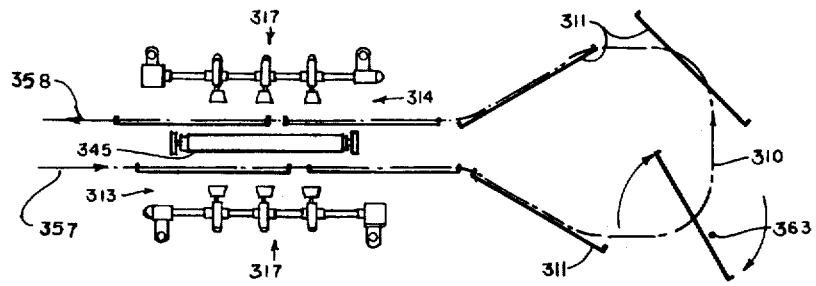
Figure 17:
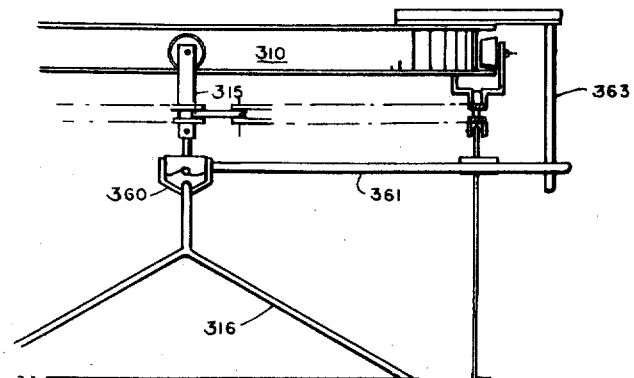

Two other embodiments of my invention are shown in Figs. 15, 16 and 17 of the drawings. Referring to Fig. 15, which illustrates one of these embodiments, there is shown a conveyor 210 which carries articles 211 over a U-shaped path. The straight conveyor portions arranged parallel to each other are identified as 257 and 258 and move through coating stations 213 and 214 respectively, which are arranged opposite to each other. An atomizer assembly 217 and a backing electrode 245, which are identical in all respects to the atomizer assembly 117 and the backing electrode 145, respectively, shown in Fig. 12, are provided for each of the coating stations 213 and 214. The atomizer assemblies 217 are arranged in a back-to-back relation between conveyor portions 257 and 258 so that one of them directs a spray of coating material at the articles moving on the conveyor portion 257 and the other directs a spray of coating material at the articles moving on the conveyor portion 258. The backing electrodes 245 are located on the outside of the conveyor portions 257 and 258 and opposite to the atomizer assemblies 217. This embodiment of my invention is especially useful where a limited space is available. Another advantage of this embodiment, wherein the atomizer assemblies 217 located at the stations 213 and 214 are in close proximity to each other, is that the electrical losses are much smaller. This permits more atomizers to be operated with the same amount of electrical energy, thus making the apparatus more efficient.

Another embodiment of my invention is shown in Fig. 16, where there is shown a conveyor 310 for carrying articles 311 through coating stations 313 and 314. The portion of the conveyor moving articles through the coating station 313 is identified as 357 and the portion of the conveyor moving articles through coating station 314 is identified as 358. The conveyor portions 357 and 358 are arranged generally parallel and closely adjacent to each other. A backing electrode 345 is positioned between conveyor portions 357 and 358 to serve as a common electrode for both coating stations 313 and 314. Separate atomizer assemblies 317 identical to the atomizer assembly 117 shown in Fig. 12 are positioned on the outside of conveyor portions 357 and 358 and opposite to the backing electrode 345.

In the apparatus illustrated in both Figs. 15 and 16, the articles to be coated are maintained in a fixed position during the time they are moved through each coating station; therefore, it is evident that the articles must be reoriented on the conveyor between the two coating stations if it is desired to paint both sides of the articles. This turning may be accomplished either manually or by using a conveyor article support illustrated in Fig. 17 in cooperation with a stop such as 263 in Fig. 15 or 363 in Fig. 16. Referring to Figs. 16 and 17, there is shown the conveyor 310. Suspended from this conveyor is a pendant 315 from the free end of which is supported a positioning rotor 360. This rotor may be of any suitable type that permits orienting articles in two fixed positions 180 degrees apart. A rod 361 is affixed to rotor 360 and normally extends parallel to the conveyor 310. Article support 316, which conveniently may be in the form of an inverted Y-shaped hook, is affixed to the lower end of the rotor and is adapted to support article 311 which is an ironing board. As an article on conveyor 310 moves out of coating station 313 after having one side coated and moves toward coating station 314, the rod 361 engages stop 363. As the conveyor 310 continues to move, the stop will progressively rotate the positioning rotor 360 until the article supported from it is moved 180 degrees from its position in coating station 313. At such time the rod 361 moves out of engagement with stop 363, and the article is properly oriented to have its other side coated at coating station 314.

Figure 18:
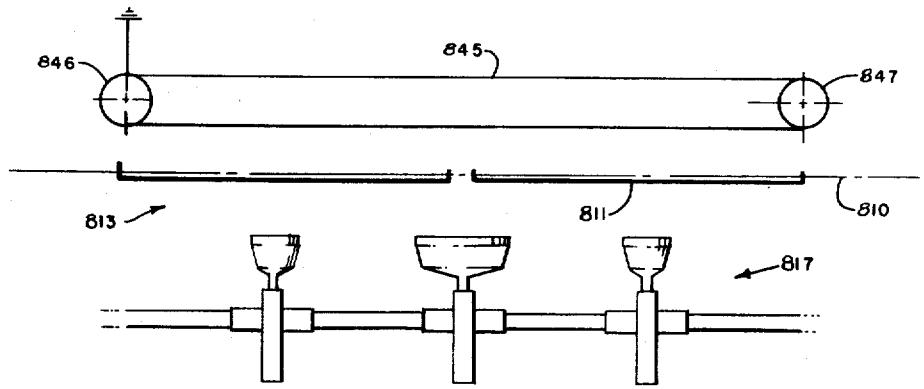

Still another embodiment of my invention is shown in Fig. 18. Here there is shown a conveyor 810, which moves over a path that passes through coating station 813. On one side of the conveyor 810 there is provided an atomizer assembly 817 identical to assembly 117 shown in Fig. 12. On the opposite side of conveyor 810 from the location of the atomizer assembly 817, there is provided a backing electrode 845 which is movably mounted on rollers 846 and 847. The backing electrode in this embodiment is movable mounted so that the face adjacent the conveyor moves parallel to the conveyor and in its direction of movement. Whereas, the backing electrode 845 is shown spaced from the articles on the conveyor 810 it is to be understood that the backing electrode can be in contact with the articles on the conveyor without departing from my invention.

Figure 19:
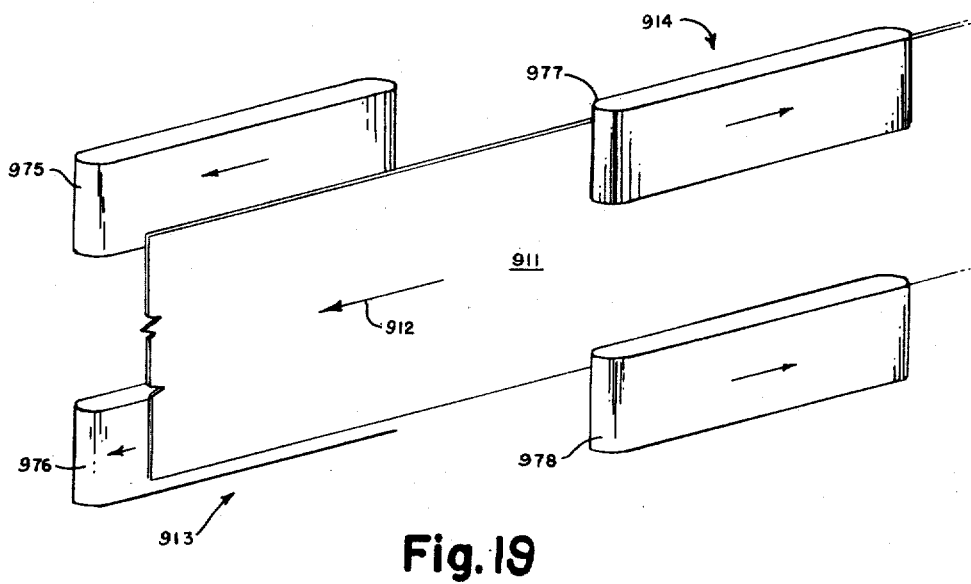

A further embodiment of my invention is shown in Fig. 19. Referring to this figure, there is shown a sheet 911 which is adapted to move in the direction of arrow 912 through coating stations 913 and 914. Adjacent the upper and lower edges and on one side of the sheet 911 at the coating station 913 there are provided backing electrodes 975 and 976. On the opposite side of the sheet from the location of electrodes 975 and 976 and at coating station 914, there are provided adjacent the upper and lower edges of sheet 911 electrodes 977 and 978. In this arrangement an article, such as the continuous sheet 911, may be coated on both sides by providing atomizer assemblies like atomizer assembly 117 in each of the coating stations 913 and 914 and locating them on the opposite sides of the sheet from the location of the backing electrodes at the respective coating stations. By this arrangement, uniform coating of sheet material on both sides is accomplished simply and efficiently.

In all of the various embodiments of my invention described above and illustrated in the drawings, the backing electrode is at the same potential as the articles being coated. This is satisfactory where the articles 111 and the backing electrode are in engagement with each other in the coating zone, or where the spacing between them is extremely small. However, where the backing electrode is spaced a substantial distance from the articles in the coating zone, it is desirable that the difference of the electrical potential between the backing electrode and the discharge electrode be sufficiently greater than the difference of electrical potential between the articles and the discharge electrode to compensate for the spacing between the article and the backing electrode.

Also in the description and drawings of the various embodiments of my invention, the coating material is electrically atomized and electrostatically charged by the electrostatic atomizers; however, it is to be understood that it is within the scope of my invention to supply charged coating material particles adjacent the surfaces being coated by means other than electrostatic atomizers. For example, the coating material may be directed into the coating zone by air atomizing guns past an ionizing or discharge electrode.

As a specific application of my invention, I cite the coating of metal ironing boards with apparatus like that shown and with a continuous plane backing electrode. It is to be noted that the motion of this backing electrode, wherein such is shown, is such that a continuous conducting surface without substantial irregularities is always presented to the spray of charged particles. This insures that the field to the backing electrode will be substantially of constant form, that is, it will be electrostatically stationary.

In the apparatus shown in Figs. 12, 13 and 14 of the drawings in which ironing boards were satisfactorily coated the following conditions obtained:

| | |
|---|---|
| Potential of atomizer 118 | 90,000 volts (negative). |
| Potential of ironing boards 111 | Ground potential. |
| Potential of backing electrode 145 | Do. |
| Spacing between discharge edge of head 119 and surface of ironing boards 111 | 10 inches. |
| Horizontal spacing of the adjacent atomizers 118 | 15 inches. |
| Vertical spacing of adjacent atomizers 118 | 3 inches. |
| Spacing between backing electrode 145 and the closest surface of ironing boards 111 | 1 inch. |
| Length of ironing boards 111 | 5 feet. |
| Greatest width of ironing boards 111 | 18 inches. |
| Spacing between adjacent ironing boards 111 | 8 inches. |
| Distance of lowest portion of ironing board above floor | 36 inches. |
| Distance of top of backing electrode 145 above floor | 6 feet |
| Distance of lower edge of backing electrode above the floor | 1½ feet. |
| Width of backing electrode 145 | 6 feet. |
| Liquid coating material | Synthetic enamel, modified urea formaldehyde, 20 sec. on Zahn #2 cup at 75° F. |

It is to be understood that my invention is not to be limited to the arrangement of the articles set forth in the above specification but is useful for coating any other arrangements of articles.

I claim:

1. In apparatus for electrostatically coating an article, an applicator having a discharge portion, means for supplying liquid coating material to the discharge portion of said applicator, an initiating member, a support for supporting an article, means for presenting said initiating member and the article on said support successively in opposed spaced relation to the discharge portion of said applicator, and means including a high-voltage source for maintaining between said initiating member and the coating material on said discharge portion, an electrostatic field having a sufficient potential gradient at said discharge portion for initiating electrostatic atomization of the coating material therefrom, said last mentioned means also being adapted to maintain between the article and the coating material on said discharge portion an electrostatic field having a sufficient potential gradient at said discharge portion for continuing the atomization of the liquid to coat the article.

2. In apparatus for electrostatically coating an article, an applicator having a discharge portion movable along a predetermined path extending into a coating zone, a support for supporting an article in said coating zone in opposed, spaced relation to one portion of the path of the discharge portion of said applicator, a conducting member disposed in opposed spaced relation to another portion of said path, means for supplying coating material to the discharge portion of said applicator, means for moving said applicator along said path successively past said supplying means, said conducting member and the supported article, and means including a high-voltage source for maintaining a first electrostatic field anterior of said coating zone and between the coating material on said discharge portion and said conducting member and a second electrostatic field in said coating zone between the coating material on said discharge portion and the supported article, said first field initiating the electrostatic atomization of coating material from said discharge portion and said second field continuing the atomization of coating material from the said discharge portion and depositing upon the article to be coated that material atomized by said second field.

3. Electrostatic coating apparatus having in combination, a discharge member provided with a discharge portion, means for supplying liquid coating material to said discharge portion, a conducting member at one side of and spaced from said discharge member and oppositely disposed therefrom, means for moving a plurality of articles successively and in spaced relation to each other over a predetermined path past said discharge member on the side where said conducting member is located, and means including a high-voltage source for creating between said conducting member and the articles on the one hand and the liquid coating material on said discharge member on the other hand an electrostatic field having a sufficient potential gradient at said discharge portion sufficient to atomize particles from the liquid thereat and deposit such atomized particles on the articles, said conducting member maintaining a sufficient potential gradient at said discharge portion in the absence of an article opposite said discharge member to maintain electrostattic atomization of liquid therefrom and collecting atomized coating material not deposited on the articles.

4. The method of electrostatically coating an article, comprising the steps of forming liquid coating material into a thin film having a terminal edge, initiating electrostatic atomization of fine particles of coating material at spaced points along said terminal edge, moving said film into a coating zone remote from the site of formation of said film and from the site of initiation of atomization with the terminal edge of said film disposed in spaced relation to an article to be coated, creating between said film and the article in said coating zone an electrostatic field capable of continuing the electrostatic atomization along said terminal edge, electrostatically dispersing the atomized particles, and electrostatically depositing the dispersed, atomized particles on the article.

5. In the method of electrostatically coating an article, the steps of presenting an edge of a film of liquid in a predetermined position remote from an article to be coated, establishing electrostatic atomization of the liquid from the edge of said film and thereafter and while maintaining such atomization moving said film-edge longitudinally of itself into opposed spaced relation to the article for depositing the atomized coating material on said article.

6. In the method of electrostatically coating an article with electrostatically atomized liquid coating material, the steps of forming liquid coating material into a film having an elongated terminus along one side thereof, initiating atomization of the coating material from said terminus with the aid of an electrostatic field existing over the surface of a stand-in electrode and extending to said terminus, and then producing relative movement of the film on the one hand and of the article and electrode on the other to effect replacement of the electrode by the article in the path of atomized material, the potential gradient of said field at said terminus being maintained sufficiently intense after atomization is initiated from said terminus to continue atomizing liquid from said terminus.

7. In a method of electrostatically coating an article with electrostatically atomized liquid coating material, the steps of forming liquid coating material into a film having an elongated terminus along one side thereof, initiating atomization of the coating material from said terminus and formation of the atomized material into a spray with the aid of an electrostatic field existing over the surface of a stand-in electrode and extending to said terminus and then moving the electrode to cause diversion of the spray from such electrode to the article to be coated, and maintaining the potential gradient of said field at said terminus at sufficient intensity to continue to atomize coating material from said terminus in the form of a spray.

8. In a method of utilizing electrostatically atomized liquid coating material, the steps of maintaining atomization of the coating material from a terminus and formation of the atomized material into a spray with the aid of an electrostatic field existing over the surface of an article to be coated and extending to said terminus, causing relative movement of the terminus on the one hand and the article and a stand-in electrode on the other to effect replacement of the article by the electrode in the spray without substantially varying the potential gradient of the field at said terminus, and then terminating atomization of the liquid material.

9. In an electrostatic coating apparatus having an electrostatic atomizing head from which liquid coating material is electrostatically atomized for deposition on an article on a conveyor, a stand-in electrode, means supporting said electrode independent of any moving element of the conveyor for movement into and out of an operative position opposite said head, and means including a source of high voltage for creating between the head and electrode when the latter is in operative position an electrostatic field of strength sufficient to atomize liquid coating material from said head.

10. The invention set forth in claim 9 with the addition of means for moving said electrode into and out of operative position, and control mechanism selectively responsive to the presence or absence of an article in coating position opposite said head for causing said moving means to move the electrode into operative position when no article is in coating position and out of operative position when an article is in coating position.

11. The invention set forth in claim 9 with the addition of a conveyor having a series of article-supports for conveying a series of articles to be coated successively through a coating position opposite said head, and means responsive to the presence of an article on an article-support nearing coating position for automatically moving said electrode out of operative position.

12. The invention set forth in claim 9 with the addition of a conveyor having a series of article-supports for conveying a series of articles to be coated successively through a coating position opposite said head, and means responsive to the presence of an article on an article support nearing coating position for automatically connecting said electrode to said conveyor and thereby causing the electrode to be moved out of operative position by the motion of the conveyor.

13. The invention set forth in claim 9 with the addition of a conveyor having a series of article-supports for conveying a series of articles to be coated successively through a coating position opposite said head, and means responsive to the absence of an article from an article-support nearing coating position for automatically moving said electrode into operative position.

14. The invention set forth in claim 9 with the addition of a conveyor having a series of article-supports for conveying a series of articles to be coated successively through a coating position opposite said head, and means responsive to the absence of an article from an article-support nearing coating position for automatically connecting said electrode to said conveyor and thereby causing the electrode to be moved into operative position by the motion of the conveyor.

15. In an electrostatic coating apparatus having an electrostatic atomizing head from which liquid coating material is electrostatically atomized for depositfon on an article to be coated, means including a source of high voltage for creating between the head and the article an electric potential difference, a conveyor for moving the article past said head, a stand-in electrode, means for supporting said electrode independently of any moving part of said conveyor, and means for moving said electrode into operative position with respect to the head at the same rate as the articles are moved by the conveyor.

16. In a method of electrostatically coating articles in which the articles move successively along a predetermined path in substantially uniform spaced relation through a coating zone and there receive charged coating material particles emanating from a point of origin spaced from such path and moving toward the articles in the form of a spray over courses which for the major portion of their extent are determined substantially entirely by the electrostatic forces of a field established between such point of origin and the articles, the steps of establishing between such point and a standin electrode spaced from the article path and lying in the spray path before the first of said articles enters into spray-receiving position an initiating electrostatic field having a pattern similar to that which will exist when an article is in spray-receiving position, and maintaining said initiating field between said source and said standin electrode until the first of said articles reaches spray-receiving position.

17. In a method of utilizing liquid coating material in which articles to be coated move successively along a predetermined path in substantially uniform spaced relation through a coating zone and there receive charged coating material particles emanating from a point of origin spaced from such path and moving toward the articles in the form of a spray over courses which for the major portion of their extent are determined substantially entirely by the electrostatic forces of a field established between such point of origin and the articles, the steps of maintaining to such point as the last of such articles moves out of spray-receiving position an electrostatic field having a pattern similar to that which existed when an article was in spray-receiving position, and then terminating the atomization of the coating material from said point of origin.

18. Apparatus for electrostatically coating a plurality of articles having, in combination, a conveyor for moving the plurality of articles successively over a predetermined path in a coating zone, said conveyor including a plurality of supports for supporting the articles in spaced relation from each other, means including a spray source for directing a spray of charged particles into the coating zone for intersecting said predetermined path, an electrode maintained at a substantially different electrical potential from that of the spray, and means for moving said electrode intermediate said source and said path into the course of said spray in response to the absence of an article on a support just prior to said support moving through said coating zone.

19. Apparatus for electrostatically coating a plurality of articles having, in combination, a conveyor for moving the plurality of articles successively over a predetermined path in a coating zone, said conveyor including a plurality of supports for supporting the articles in spaced relation from each other, means including a spray source for directing a spray of charged particles into the coating zone for intersecting said predetermined path, an electrode maintained at a substantially different electrical potential from that of the spray, and means for moving said electrode into the course of said spray in response to the absence of an article on a support just prior to said support moving through said coating zone.

20. In apparatus for coating a series of articles, a conveyor for moving the articles successively over a predetermined path through a coating zone, means for creating a spray of electrically charged particles directed toward said path for electrostatic deposition on the articles, an electrode maintained at a particle-attracting potential, and means supporting said electrode for movement over a path spaced along said spray from the article-path into and out of an operative position in which it diverts charged particles from articles.

21. A method of electrostatically coating a plurality of articles, comprising spacing a discharge electrode from a second electrode, establishing an electrostatic field between the electrodes to define a coating zone therebetween, moving successively over a predetermined path in said coating zone a plurality of articles spaced from each other and in a different plane from said second electrode, the surfaces of said articles presented toward said discharge electrode varying in dimension transverse to the line of movement thereof, introducing a spray of finely divided coating material particles between the path of article movement and said discharge electrode and directing it toward said article path for electrostatically depositing the material on the articles, the transverse dimension of said spray at the point of intersection with the path of article movement being as great as the greatest transverse dimension of the articles, and maintaining the spacing of the second electrode from the path of article movement and the voltage relationships between the discharge electrode, articles, and second electrode so as to greatly minimize "snap" of the field from one article to a succeeding article and to cause a substantial portion of the coating material to overspray and miss the articles at portions of greatly reduced transverse dimension thereof.

22. A method of electrostatically coating a plurality of articles, comprising spacing a discharge electrode from a second electrode, establishing an electrostatic field between the electrodes to define a coating zone therebetween, moving successively over a predetermined path in said coating zone a plurality of articles spaced from each other and in a different plane from said second electrode, the surfaces of said articles presented toward said discharge electrode varying in dimension transverse to the line of movement thereof and said second electrode presenting a surface having longitudinal and transverse dimensions of the order of the maximum such dimensions of the articles, introducing a spray of finely divided coating material particles between the path of article movement and said discharge electrode and directing it toward said article path for electrostatically depositing the material on the articles, the transverse dimension of said spray at the point of intersection with the path of article movement being as great as the greatest transverse dimension of the articles, and maintaining the spacing of the second electrode from the path of article movement and the voltage relationships between the discharge electrode, articles, and second electrode so as to greatly minimize "snap" of the field from one article to a succeeding article and to cause a substantial portion of the coating material to overspray and miss the articles at portions of greatly reduced transverse dimension thereof.

23. A method of electrostatically coating a plurality of articles, comprising spacing a discharge electrode from a second electrode, establishing an electrostatic field between the electrodes in a coating zone, maintaining said second electrode electrostatically stationary, moving successively over a predetermined path in said coating zone a plurality of metallic articles spaced from each other, maintaining said articles at a potential sufficiently different from said discharge electrode to intercept and terminate at least the major portion of the lines of force which would otherwise extend to the second electrode, the surfaces of said articles presented toward said discharge electrode varying in dimension transverse to the path of movement thereof, introducing a spray of finely divided coating material particles between the path of article movement and said discharge electrode and directing it toward said article path for electrostatically depositing the material on the atricles, the transverse dimension of said spray at the point of intersection with the path of article movement being as great as the greatest transverse dimension of the articles, whereby to cause a substantial proportion of the coating material to overspray and miss the articles at portions of greatly reduced transverse dimension thereof.

24. A method of electrostatically coating a plurality of sheet-like articles, comprising moving the plurality of sheet-like articles edgewise of themselves and spaced from each other successively through first and second coating zones, the paths of article movement in said first and second coating zones being generally parallel to each other, positioning an electrode between the paths of article movement in said first and second coating zones, directing separate sprays of charged coating material particles toward the articles in each coating zone from the opposite sides of the paths of article movement to where said electrode is located, and maintaining said articles and said electrode at a substantial difference of electrical potential from that of the charged spray for attracting said charged spray to said articles and said electrode.

25. An apparatus for electrostatically coating a plurality of sheet-like conducting articles, comprising an electrostatic atomizer and an electrode disposed in opposed spaced relation to each other, a conveyor for moving the articles edgewise of themselves between said atomizer and said electrode, the surfaces of said articles presented toward said atomizer varying in dimension transverse to their line of movement, and means including a high voltage source for creating a substantial potential difference between said atomizer on the one hand and said articles and said electrode on the other for atomizing from said atomizer liquid coating material in the form of a spray of similarly charged particles and for directing such spray to intersect the article path and for forming the spray to have a transverse dimension at the point of intersection with the path of article movement at least as great as the greatest transverse dimension of the articles, the spacing of the electrode from the path of article movement and the voltage relationships between the atomizer, articles, and said electrode being such that said electrode causes a substantial portion of the coating material to overspray and miss the articles at portions of greatly reduced transverse dimension thereof.

26. Electrostatic coating apparatus having in combination, a discharge member, means for supplying liquid coating material to said discharge member, a conducting member disposed in opposed spaced relation to said discharge member, means for moving a plurality of electro-conductive articles successively in spaced relation to each other over a predetermined path between said discharge member and said conducting member and spaced therefrom, and means including a high-voltage source for creating between said conducting member and the articles on the one hand and the liquid coating material on said discharge member on the other hand an electro-static field of sufficient strength to atomize particles from the liquid on said discharge member and deposit such atomized particles on the articles, said conducting member being arranged relative to the article path and the discharge member to maintain the strength of said field when spaces between the articles are opposite the discharge member and to attract atomized coating material in said spaces for deposition on said conducting member.

27. Electrostatic coating apparatus having in combination means for moving a plurality of spaced electro-conductive articles over a predetermined path through a coating zone, a backing electrode disposed in the coating zone on one side of the path of article movement and in spaced relation to the articles, means for introducing into the coating zone a spray of electrically charged liquid particles of a predetermined pattern directed from the opposite side of the article path toward said backing electrode to intersect the article path, the dimension of said backing electrode parallel to the path of article movement being at least as great as the dimension of the spray measured in the same direction at the point of its intersection of the spray with the path of article movement, means for maintaining the articles and said backing electrode at substantially different potentials from that of the charged spray for maintaining the pattern of the spray stable and for attracting the spray in the spaces between the articles for deposition on said backing electrode, and a collector disposed adjacent the lower portion of said backing electrode for collecting the liquid particles deposited on said backing electrode.

28. Electrostatic coating apparatus having in combination means for moving a plurality of spaced electro-conductive articles over a predetermined path through a coating zone, a backing electrode disposed in the coating zone on one side of the path of article movement and in spaced relation to the articles, and means including a high-voltage source and a second electrode located on the opposite side of the article path from said backing electrode for introducing into the coating zone a spray of electrically charged liquid particles of predetermined pattern directed from such opposite side of the article path toward said backing electrode to intersect the article path, said high-voltage source having one terminal connected to said second electrode and the other to the articles and backing electrode to create an electro-static field having lines of force extending from said second electrode to the articles and other lines of force extending from said second electrode to said backing electrode, said backing electrode being so arranged relative to said second electrode and the article path that the spray is attracted to the articles and backing electrode while maintaining its predetermined pattern and particles crossing the article path through the spaces between the articles will be deposited on said backing electrode.

29. A method of electrostatically coating a plurality of electro-conductive articles comprising forming a spray of electrically charged coating material particles, maintaining an electrode at an electrical potential different from the charged particles electrostatically to attract the charged particles and electrostatically to move substantially all of said particles in a predetermined path thereto, passing a plurality of the articles in spaced relationship through and transversely of said path, and maintaining the articles at an electrical potential different from the charged particles electrostatically to attract the particles to the articles whereby to deposit the charged particles on the articles passing through said path and to deposit the particles in the space between the articles on the electrode.

30. A method of electrostatically coating a plurality of electro-conductive articles comprising providing a charging electrode for electrically charging a spray of coating material particles, maintaining a second electrode at an electrical potential different from the charging electrode to provide an electrostatic field of predetermined gradient therebetween whereby to attract the charged particles to said second electrode, passing a plurality of the articles in spaced relationship through and transversely of the path of movement of the particles toward said second electrode, and maintaining the articles at an electrical potential different from that of the first electrode to provide an electrostatic field having a gradient substantially equal to the gradient of the first mentioned field therebetween whereby to deposit the charged particles on the articles passing through said path and to deposit the particles in the spaces between the articles on the second electrode.

31. Apparatus for electrostatically coating a plurality of electro-conductive articles comprising means for forming a spray of electrically charged coating material particles, an electrode disposed in opposed spaced relationship to said atomizing means electrostatically to move said particles thereto in a path defining therebetween a coating zone, a conveyor for moving the articles in spaced relationship through said coating zone, said electrode having dimensions transversely and longitudinally of the path of article movement at least equal to the transverse dimension of the articles and the longitudinal spacing thereof on the conveyor, and means for maintaining the articles and the electrode at a potential different from the spray particles electrostatically to deposit the particles on the articles in the coating zone, the particles moving in the spaces between the articles being deposited on the electrode.

32. The invention set forth in claim 31 with the addition of a cleaner for said electrode, and means for producing relative movement of the cleaner and said electrode to remove from the latter coating material deposited thereon.

33. The invention set forth in claim 31 with the addition of a cleaner for said electrode, means for moving said electrode transverse to the direction of article movement past and in engagement with said cleaner to remove from said electrode coating material deposited thereon, and a sump disposed below said electrode for collecting the coating material removed from said electrode.

34. The invention set forth in claim 31 with the addition of a cleaner for said electrode, and means for moving said electrode generally in the direction of article movement past and in engagement with said cleaner to remove from said electrode coating material collected thereon, said electrode comprising an endless flexible member.

35. A method of electrostatically coating an article which comprises providing a charging electrode and a collecting electrode, establishing an electrostatic field between said electrodes, introducing atomized coating material particles into said field adjacent the charging electrode, maintaining the field at a sufficient gradient electrostatically to move substantially all of said particles in a predetermined path toward said collecting electrode and to define between the electrodes a coating zone, passing a plurality of articles along a predetermined path to pass surface portions of said articles through said zone, maintaining the article surface portions at an electric potential to establish between an article surface portion in said zone and the charging electrode an electrostatic field having a gradient at least equal to the gradient of the first mentioned field, with the electrostatic field between an article surface portion out of said zone and said charging electrode being of lesser gradient than said first mentioned field whereby said particles are deposited on an article surface portion in said zone and on the collecting electrode in the absence of an article surface portion in said zone.

36. In an electrostatic coating method in which atomized coating material particles are introduced into an electrostatic field between an article moving in a predetermined path and a charging electrode and are electrostatically moved toward the article for deposition thereon in a coating zone, the method which comprises reducing to a desired amount the extent of the zone along the line of article movement by providing a backing electrode beyond said path and maintaining said backing electrode at an electrical potential sufficient to establish between itself and said charging electrode an electrostatic field having a gradient at least equal to the gradient of the first mentioned field extending between the charging electrode and an article surface portion at the edge of the desired coating zone and greater than the field gradient between the charging electrode and an article surface portion positioned beyond the desired coating zone.

37. A method of electrostatically coating a plurality of surface portions of electro-conductive articles moving in spaced relation through a coating zone comprising forming a spray of electrically charged coating material particles and electrostatically moving said particles to said coating zone to provide a normal deposition pattern thereat and then electrostatically moving out of said coating zone to a collecting point, in the absence of an article surface portion from any substantial portion of said pattern area, the majority of particles which would have normally been deposited from said pattern area portion without materially affecting the deposition of particles in a pattern area portion having a surface portion therein.

References Cited in the file of this patent

UNITED STATES PATENTS

| | | |
|---|---|---|
| 2,300,324 | Thompson | Oct. 27, 1942 |
| 2,509,276 | Ransburg et al. | May 30, 1950 |
| 2,608,176 | Jenkins et al. | Aug. 26, 1952 |
| 2,632,716 | Starkey | Mar. 24, 1953 |
| 2,636,471 | Starkey | Apr. 28, 1953 |
| 2,651,287 | Turner | Sept. 8, 1953 |
| 2,658,009 | Ransburg | Nov. 3, 1953 |
| 2,658,472 | Ransburg | Nov. 10, 1953 |
| 2,711,155 | Starkey | June 21, 1955 |

UNITED STATES PATENT OFFICE
CERTIFICATE OF CORRECTION

Patent No. 2,795,516

June 11, 1957

Emery P. Miller

It is hereby certified that error appears in the printed specification of the above numbered patent requiring correction and that the said Letters Patent should read as corrected below.

Column 1, line 22, after "1950" strike out the period and insert -- , now Patent No. 2,718,477. --; line 26, strike out "now Patent No. 2,718,477,"; column 7, line 31, for "ligth" read -- light --; column 11, line 55, for "stabilizers" read -- stabilizes --; column 13, line 3, strike out "its normal or stand-in position. Switches 742 and 743" and insert instead -- When connected in this manner connector coil 176 will --; column 19, line 26, for "electrostattic" read -- electrostatic --; column 23, line 71, before "measured" insert -- pattern --; column 24, line 43, for "space" read -- spaces --.

Signed and sealed this 20th day of August 1957.

(SEAL)
Attest:

KARL H. AXLINE
Attesting Officer

ROBERT C. WATSON
Commissioner of Patents